United States Patent
Mukherjee

(10) Patent No.: US 11,079,767 B2
(45) Date of Patent: Aug. 3, 2021

(54) LIDAR BASED RECOGNITION OF RIDE HAILING GESTURES FOR AUTONOMOUS VEHICLES

(71) Applicant: GM Cruise Holdings LLC, San Francisco, CA (US)

(72) Inventor: Rajaditya Mukherjee, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 262 days.

(21) Appl. No.: 16/365,094

(22) Filed: Mar. 26, 2019

(65) Prior Publication Data

US 2020/0310433 A1   Oct. 1, 2020

(51) Int. Cl.
| | |
|---|---|
| *G05D 1/02* | (2020.01) |
| *G01S 17/89* | (2020.01) |
| *G05D 1/00* | (2006.01) |
| *G06K 9/00* | (2006.01) |
| *G06K 9/62* | (2006.01) |

(52) U.S. Cl.
CPC .............. *G05D 1/024* (2013.01); *G01S 17/89* (2013.01); *G05D 1/0088* (2013.01); *G06K 9/00355* (2013.01); *G06K 9/00369* (2013.01); *G06K 9/00791* (2013.01); *G06K 9/6215* (2013.01); *G05D 2201/0212* (2013.01); *G05D 2201/0213* (2013.01)

(58) Field of Classification Search
CPC ................. G05D 1/024; G05D 1/0088; G05D 2201/0212; G05D 2201/0213; G01S 17/89; G06K 9/00355; G06K 9/00369; G06K 9/00791; G06K 9/6215
See application file for complete search history.

(56) References Cited

U.S. PATENT DOCUMENTS

2020/0272143 A1 *   8/2020   Scott ...................... G06Q 10/02

OTHER PUBLICATIONS

Huang, et al., "L1-Medial Skeleton of Point Cloud", In ACM Trans. Graph., vol. 32, No. 4, 2013, 8 pages.
Barros, et al., "Real-Time Human Pose Estimation from Body-Scanned Point Clouds", In International Conference on Computer Vision Theory and Applications, Mar. 2015, 9 pages.

* cited by examiner

*Primary Examiner* — Michael D Lang
(74) *Attorney, Agent, or Firm* — Medley, Behrens & Lewis, LLC

(57) ABSTRACT

An AV is described herein. The AV includes a lidar sensor system. The AV additionally includes a computing system that executes a gesture recognition component to determine, based upon lidar sensor data, whether a pedestrian in a driving environment of the AV is performing a hailing gesture. The AV can be configured to initiate a pickup maneuver to approach the pedestrian in response to determining that the pedestrian is performing a hailing gesture.

20 Claims, 10 Drawing Sheets

LIDAR BASED RECOGNITION OF RIDE HAILING GESTURES FOR AUTONOMOUS VEHICLES

BACKGROUND

An autonomous vehicle (AV) is a motorized vehicle that can operate without human conduction. An exemplary AV includes a plurality of sensor systems, such as, but not limited to, a lidar sensor system, a camera sensor system, and a radar sensor system, amongst others, wherein the AV operates based upon sensor signals output by the sensor systems. For example, a radar system can identify a range from the AV to another vehicle in the driving environment. In another example, an object recognition system may be configured to receive images output by a camera sensor system and to identify relative positions of objects captured in the images.

An AV can be deployed as part of an on-demand transportation service. Conventionally, an AV operating as part of an on-demand transportation service is summoned by a user by way of user interaction with an internet-connected device that is in communication with the AV or a server that is configured to dispatch the AV. However, there may be many people in an operational region of the AV who are not aware of the transportation service provided by the AV, who do not have access to internet-connected devices to summon the AV, or who are accustomed to accessing transportation in a different manner than interacting with an internet-connected device. In many cities around the world, for example, it is common for people seeking on-demand transportation to summon a taxi by making a hailing signal (e.g., a gesture such as raising an arm toward the street) that is commonly understood in the area to be a signal to hail a taxi. Conventionally, AVs are not configured to recognize such hailing signals and are therefore unable to respond to potential riders who attempt to summon transportation in the manner to which they are accustomed.

SUMMARY

The following is a brief summary of subject matter that is described in greater detail herein. This summary is not intended to be limiting as to the scope of the claims.

Described herein are various technologies pertaining to controlling operation of an AV. With more specificity, described herein are various technologies pertaining to an AV that is configured to recognize a pedestrian that is performing a hailing gesture and to initiate a pickup maneuver to allow the pedestrian to board the AV. With still more specificity, a gesture recognition component for an AV is described herein, wherein the gesture recognition component generates a skeletal model that is representative of a pose of a pedestrian based upon lidar sensor data, and determines whether the pedestrian is making a hailing signal based upon the skeletal model.

In a non-limiting example, an AV includes a lidar sensor system that comprises at least one lidar sensor. The lidar sensor system outputs lidar data based on sensor signals received from the at least one lidar sensor, where the lidar data is indicative of positions of objects in the driving environment of the AV at one or more times. In an exemplary embodiment, the lidar data comprises a three-dimensional lidar point cloud, wherein each point in the point cloud indicates a three-dimensional position of an object or surface of an object in the driving environment of the AV.

A gesture recognition component of the AV (e.g., executed by a computing system of the AV) receives all or a portion of the lidar data that is representative of a pedestrian in the driving environment. Responsive to receiving the lidar data that is representative of the pedestrian, the gesture recognition component identifies a skeletal model of the pedestrian based upon the points included in the lidar data. The skeletal model comprises a plurality of joints that are each linked to at least one other joint by way of a member, or members. The skeletal model is indicative of a pose of the pedestrian. Based upon the skeletal model, the gesture recognition component generates a pose similarity score that is indicative of whether the pose of the pedestrian indicates that the pedestrian is making a hailing gesture. The gesture recognition component then determines, based upon the pose similarity score, whether the pedestrian is making a hailing gesture.

In an exemplary embodiment, the gesture recognition component generates the pose similarity score by performing a comparison between the skeletal model and a reference skeletal model. In the example, the gesture recognition component computes a weighted sum of distances between members and/or joints in the skeletal model and the reference skeletal model, the weighted sum being the pose similarity score. In another exemplary embodiment, the gesture recognition component generates the pose similarity score based upon output of a neural network. In this example, positions and lidar intensity values assigned to the joints are provided as input features to the neural network, and the neural network outputs a probability that the pedestrian is making a hailing gesture. In such example, the probability output by the neural network can be the pose similarity score.

Upon determining that the pedestrian is making the hailing gesture, the AV can initiate a pickup maneuver that is intended to position the AV to allow the pedestrian to board. By way of example, the pickup maneuver can include deceleration of the AV such that the AV stops in proximity to the pedestrian, a lane-change maneuver to ensure that there are no lanes of traffic between a stopped position of the AV and the pedestrian, or substantially any other maneuver that facilitates a passenger boarding the AV. The AV can further output an indication to the pedestrian that the AV has stopped in response to the hailing gesture made by the pedestrian. For example, the AV can output an audio or visual cue to the pedestrian including, but not limited to, a flashing light or a spoken invitation to enter the vehicle output by way of a speaker mounted on the AV.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
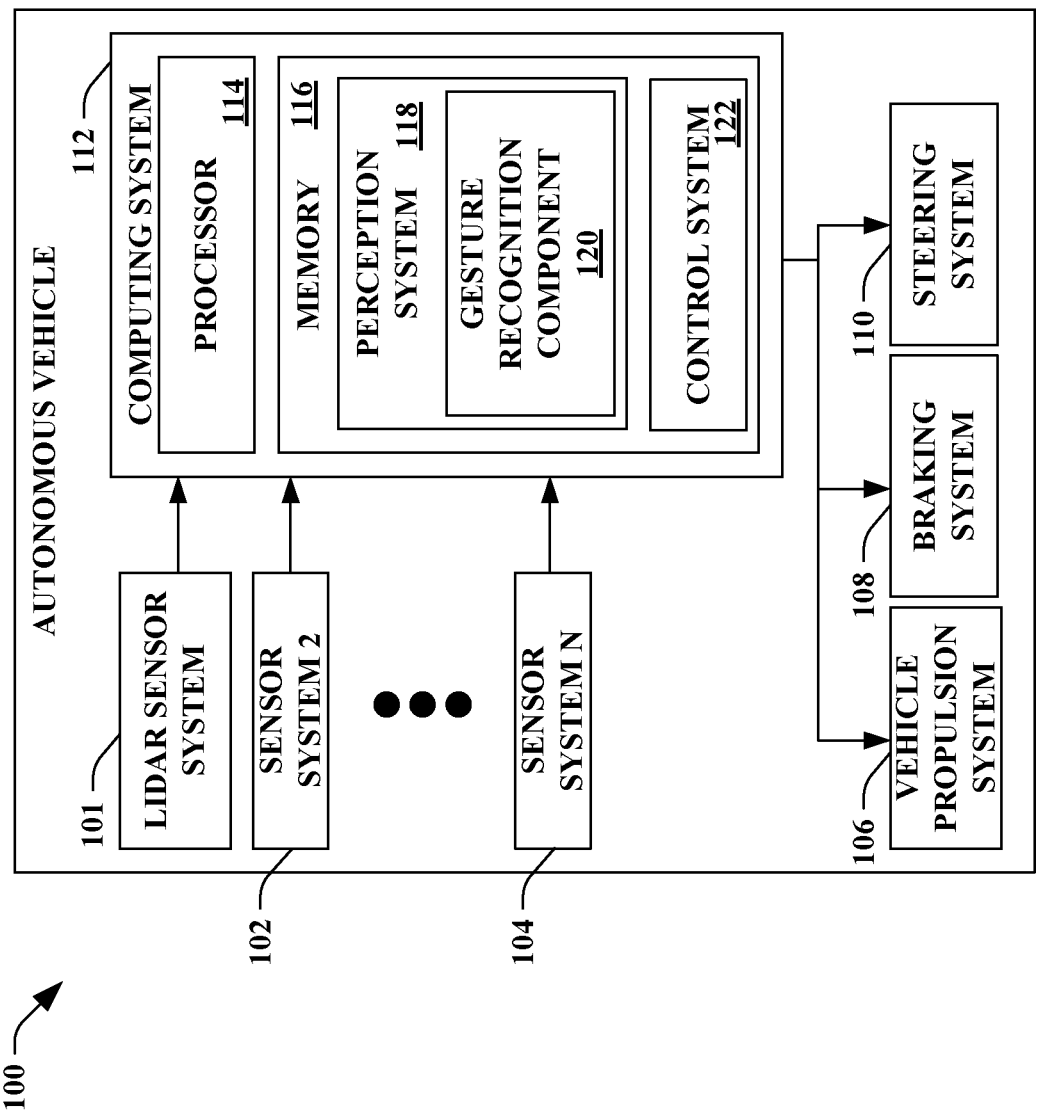
FIG. 1 illustrates an exemplary AV.

Various technologies pertaining to an AV that is configured to respond to gesture-based hailing by pedestrians in a driving environment of the AV are described herein, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

With reference now to FIG. 1, an exemplary AV 100 is illustrated. The AV 100 can navigate about roadways without human conduction based upon sensor signals output by sensor systems of the AV 100. The AV 100 includes a lidar sensor system 101 and a plurality of additional sensor systems 102-104 (a second sensor system 102 through an Nth sensor system 104). The sensor systems 102-104 may be of different types. The lidar sensor system 101 and the sensor systems 102-104 are arranged about the AV 100. For example, the second sensor system 102 may be a radar sensor system and the Nth sensor system 104 may be a camera (image) system. Other exemplary sensor systems include GPS sensor systems, sonar sensor systems, infrared sensor systems, and the like.

The AV 100 further includes several mechanical systems that are used to effectuate appropriate motion of the AV 100. For instance, the mechanical systems can include but are not limited to, a vehicle propulsion system 106, a braking system 108, and a steering system 110. The vehicle propulsion system 106 may be an electric engine, an internal combustion engine, or a combination thereof. The braking system 108 can include an engine brake, brake pads, actuators, a regenerative braking system, and/or any other suitable componentry that is configured to assist in decelerating the AV 100. The steering system 110 includes suitable componentry that is configured to control the direction of movement of the AV 100.

The AV 100 additionally comprises a computing system 112 that is in communication with the sensor systems 101-104 and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises a perception system 118 that is configured to identify objects (in proximity to the AV 100) captured in sensor signals output by the sensor systems 101-104. The perception system 118 includes gesture recognition component 120 that is configured to determine whether a pedestrian in a driving environment of the AV 100 is making a hailing gesture based upon lidar data generated by the lidar sensor system 101. As will be described in greater detail below, the perception system 118 may further include various additional components that are configured to output data indicative of positions and/or predefined types of objects in a driving environment of the AV 100. In various embodiments, the gesture recognition component 120 can determine whether a pedestrian is making a hailing gesture based upon data output by such additional components of the perception system 118, in addition to the lidar data. The memory 116 additionally includes a control system 122 that is configured to receive output of the perception system 118, and is further configured to control at least one of the mechanical systems of the AV 100 (the vehicle propulsion system 106, the brake system 108, and/or the steering system 110) based upon the output of the perception system 118. In an exemplary embodiment, the gesture recognition component 120, responsive to determining that a pedestrian in the driving environment of the AV 100 is making a hailing signal, outputs an indication that the pedestrian is making the hailing signal to the control system 122. The control system 122 can then control operation of at least one of the mechanical systems of the AV 100 based upon the indication from the gesture recognition component 120. By way of example, the control system 122 can cause the AV 100 to initiate a pickup maneuver responsive to receiving the indication that the pedestrian is making the hailing gesture. The pickup maneuver can include deceleration of the AV 100, changing lanes of the AV 100, causing the AV 100 to make a turn, etc.

The gesture recognition component 120 is configured to recognize whether a pedestrian in the driving environment of the AV 100 is making a hailing gesture based upon lidar data output by the lidar sensor system 101. In an exemplary embodiment, the lidar data comprises a three-dimensional point cloud. The point cloud includes a plurality of points that are each assigned a three-dimensional position in the driving environment (e.g., a coordinate triple). The positions of points in the point cloud are indicative of locations of objects, or surfaces of objects, in the driving environment of the AV 100. Each of the points can further be assigned an intensity value that is indicative of an intensity of the lidar return received at the lidar sensor 101 from each of the points.

Figure 2A:
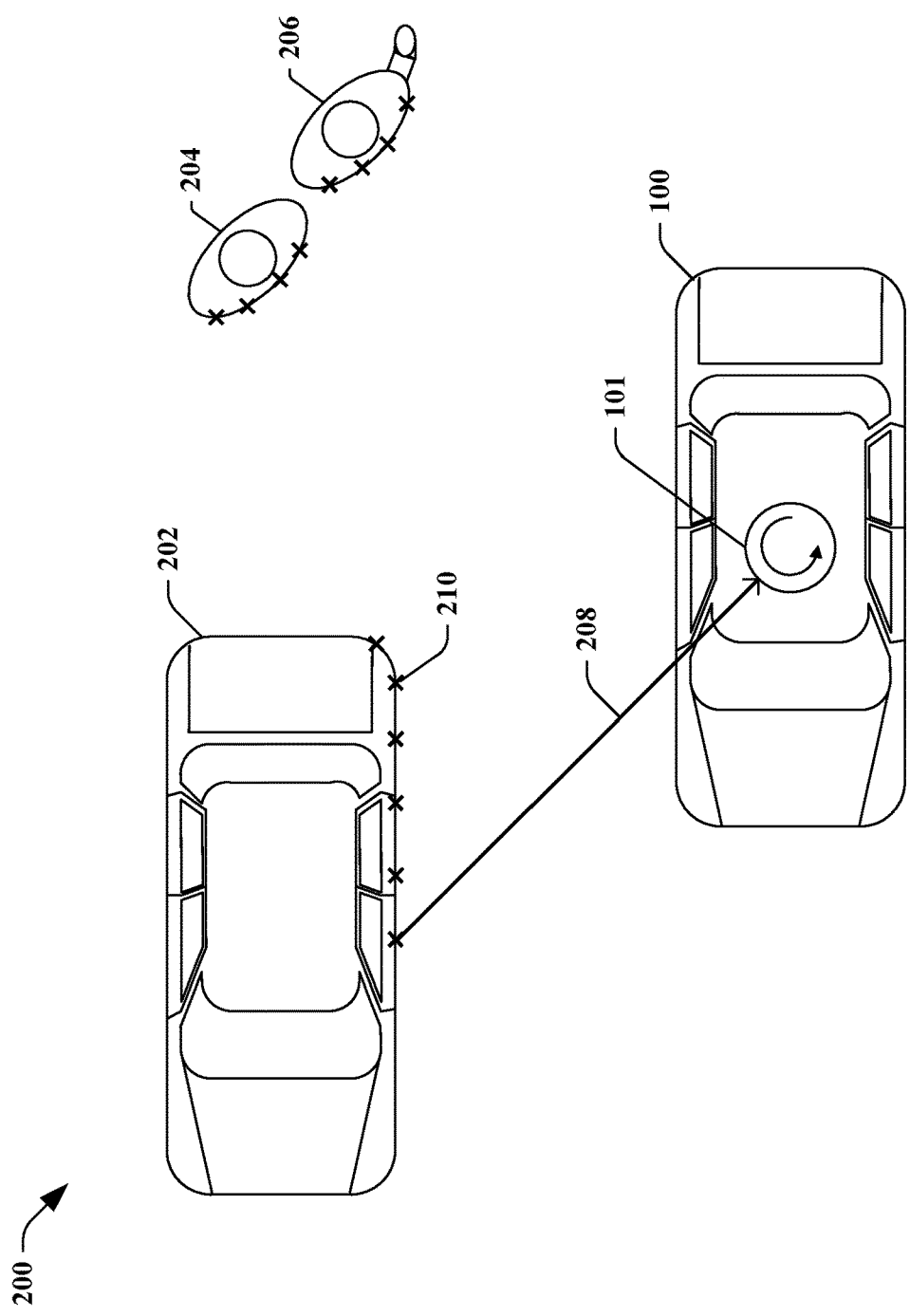
FIG. 2A is a top-down view of an exemplary driving environment of an AV.
Figure 2B:
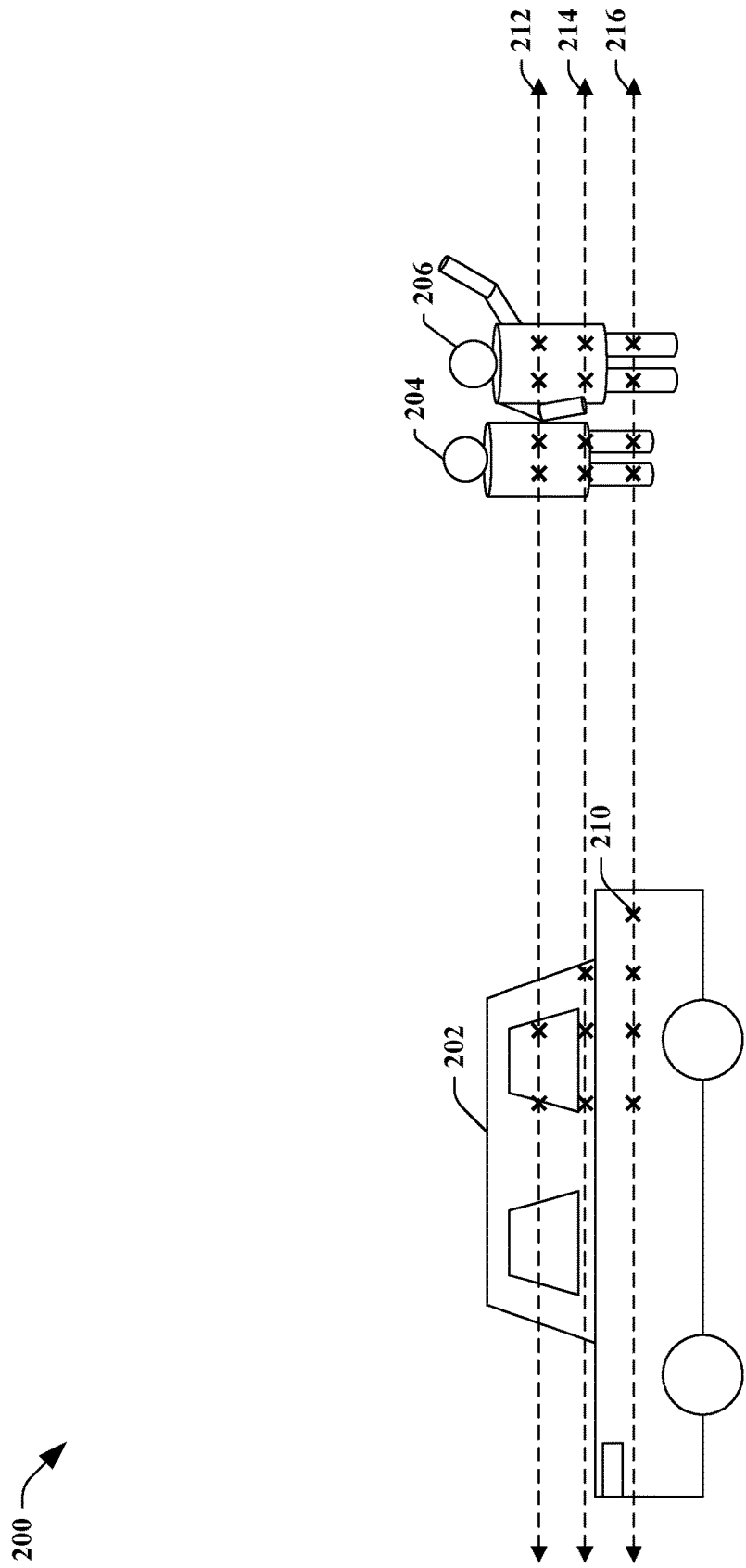
FIG. 2B is a side view of the exemplary driving environment depicted in FIG. 2A.

Exemplary operation of the AV 100 in connection with generating lidar data is now set forth. FIGS. 2A and 2B depict different views of an exemplary driving environment 200 in which the AV 100 operates. With reference now to FIG. 2A, the AV 100 is depicted in the driving environment 200, wherein the driving environment 200 includes a vehicle 202, and two pedestrians 204, 206 standing to the side of the vehicle 202. The AV 100 emits a laser beam 208 into the driving environment 200 (e.g., by way of the lidar sensor system 101). The laser beam 208 can be scanned 360° around the vehicle 100, and can impinge upon the various objects 202-206 in the environment 200. The lidar sensor system 101 receives reflections of the beam 208, and based upon such reflections outputs data indicative of positions of a plurality of points of intersection 210 of the beam 208 with the objects 202-206 in the driving environment 200. By way of example, the lidar sensor system 101 outputs data indicating a three-dimensional position of each of the points 210 (e.g., relative to the AV 100, relative to a point of reference in the driving environment 200 or outside of the driving environment 200, etc.).

It is to be understood that while a single laser beam 208 and a plurality of points of intersection 210 of the beam 208 with objects 202-206 are depicted in FIG. 2A, the lidar sensor system 101 can emit a plurality of laser beams into a driving environment of the AV 100. For instance, and referring now to FIG. 2B, a side view of the objects 202-206 in the driving environment 200 is depicted. In exemplary embodiments, the lidar sensor system 101 emits a plurality of laser beams into the driving environment of the vehicle 100, wherein each of the beams has a different angular alignment with respect to a horizontal reference plane of the vehicle 100. Further, each of a plurality of sensors in the lidar sensor system 101 may be aligned with a different respective lidar beam emitted by the lidar sensor system 101, such that the lidar sensor system 101 outputs data indicative of a plurality of points of intersection for each of the plurality of beams over a period of time. As depicted in FIG. 2B, the plurality of laser beams scan across the objects 202-206 in the driving environment 200 and intersect the objects along scan lines 212-216. Each of the points 210 where a laser beam of the lidar sensor system 101 intersects one of the objects 202-206 in the driving environment lies along one of the scan lines 212-216. Hence, each of the plurality of lidar sensors in the lidar sensor system 101 outputs data indicative of a point of intersection of a respective laser beam with various objects in the driving environment 200 along a respective scan line. A lidar point cloud output by the lidar sensor system 101 can therefore be considered a rastered image of objects in the driving environment, comprising as many scan lines as lasers are included in the lidar sensor system 101.

It is to be appreciated that over the period of a scan of a driving environment of the AV 100 by the lidar sensor system 101, the lidar sensor system 101 can output data indicative of positions of a larger number of points than are depicted in FIGS. 2A and 2B (e.g., tens of thousands of points, hundreds of thousands of points, millions of points, etc.). Furthermore, it is to be appreciated that the lidar sensor system 101 can include a greater number of lidar beams and sensors than depicted in either of FIG. 2A or 2B. By way of example, the lidar sensor system 101 can include at least 64 beams and corresponding sensors, at least 128 beams and corresponding sensors, or at least 256 beams and corresponding sensors.

Referring again to FIG. 1, the AV 100 can be configured such that the perception system 118 selectively outputs lidar data to the gesture recognition component 120 such that the lidar data output to the gesture recognition component 120 is determined to be representative of pedestrians in the driving environment. By way of example, the perception system 118 can be configured to identify which points in a lidar point cloud generated by the lidar sensor system 101 are likely to be representative of pedestrians in the driving environment of the AV 100. The perception system 118 outputs the subset of points in the point cloud that are representative of pedestrians to the gesture recognition component 120. The gesture recognition component 120 can then determine, based on the subset of points, whether a pedestrian in the driving environment is performing a hailing gesture. For example, and referring once again to FIG. 2B, there is a subset of the points 210 that is representative of the pedestrians 204, 206. The AV 100 can determine which of the points 210 is representative of the pedestrians 204, 206 in the driving environment 200. The gesture recognition component 120 can then determine that the second pedestrian 206, whose arm is raised as shown in FIG. 2B, is making a hailing gesture based on those points identified by the AV 100 as being representative of the pedestrians 204, 206.

Figure 3:
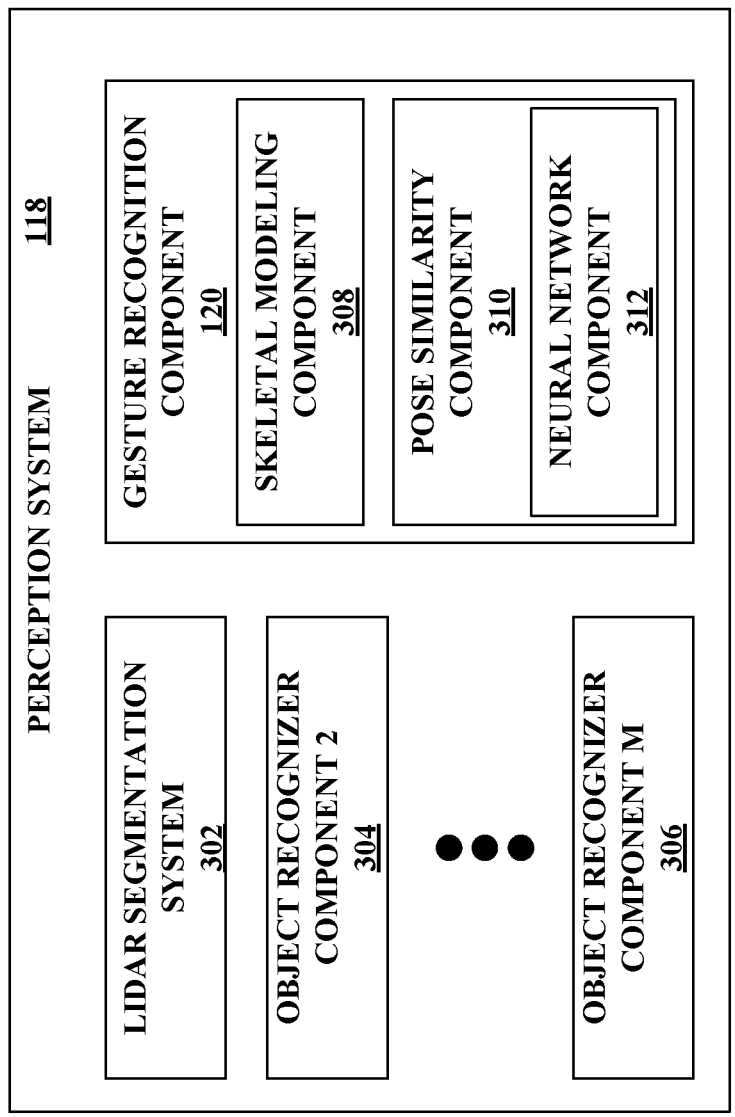
FIG. 3 is a functional block diagram of an exemplary perception system of an AV that includes a gesture recognition component.

Referring now to FIG. 3, an exemplary embodiment of the perception system 118 is shown, wherein the perception system 118 comprises the gesture recognition component 120 and further comprises a lidar segmentation system 302 and a plurality of M additional object recognizer components 304-306. The lidar segmentation system 302 is configured to perform a segmentation of a lidar point cloud (e.g., as received from the lidar sensor 101). Stated differently, the lidar segmentation system 302 is configured to determine which points in the lidar point cloud are representative of which objects in the driving environment of the AV 100. The lidar segmentation system 302 can further be configured to output an indication of a type of object for each of the objects in the driving environment of the AV 100. These predefined types of objects can include, but are not limited to, pedestrian, bike, car, truck, bus, and static, where the type "static" can represent objects that are usually not in motion such as telephone poles, construction equipment, buildings, etc.

Each of the additional object recognizer components 304-306 independently generates output based upon at least one sensor signal. In non-limiting examples, the second object recognizer component 204 outputs data indicative of types of objects based upon images output by a camera, the Mth object recognizer component outputs data indicative of ranges to objects based upon radar signals, etc. In exemplary embodiments, the perception system 118 can be configured to determine which points in the lidar point cloud are representative of pedestrians based upon data output by the lidar segmentation system 302 and the object recognizer components 304-306. For example, the perception system 118 can identify which lidar points in a lidar point cloud are representative of the objects 204, 206 in the driving environment 200 based upon data output by the lidar segmentation system 302. The perception system 118 can then identify that the objects 204, 206 are pedestrians based upon output of one of the other object recognizers 304-306.

The gesture recognition component 120 receives lidar point cloud data that is representative of one or more pedestrians in the driving environment of the AV 100 and determines whether a pedestrian is making a hailing signal based upon the lidar point cloud data. In the exemplary perception system 118 of FIG. 3, the gesture recognition component 120 comprises a skeletal modeling component 308 and a pose similarity component 310. The skeletal modeling component 308 is configured to receive a set of lidar points (e.g., a plurality of points that each includes a three-dimensional coordinate triple and optionally an intensity value indicative of the intensity of the lidar return from that point) that is representative of a pedestrian and to output a skeletal model that is indicative of a pose of the pedestrian. The pose similarity component 310 generates a pose similarity score based upon the skeletal model output by the skeletal modeling component 308. The pose similarity score indicates a likelihood that the pedestrian is making a hailing gesture.

The skeletal modeling component 308 generates a skeletal model for a pedestrian in the driving environment of the AV 100 based upon points in the lidar point cloud that are indicated by the perception system 118 as being representative of the pedestrian. The skeletal model generated by the skeletal modeling component 308 comprises a plurality of joints. Each of the joints is assigned a position that is determined from the positions of the points that are representative of the pedestrian based upon execution of a skeleton detection algorithm. Any of various algorithms can be employed by the skeletal modeling component 308 in connection with determining positions of joints in the skeletal model. By way of an example, the skeletal modeling component 308 can employ an L1-median skeleton detection algorithm in connection with generating the skeletal model. By way of another example, the skeletal modeling component 308 can employ an algorithm based on expectation maximization over an initial base skeletal model to generate the skeletal model of the pedestrian. The joints of the skeletal model can each be joined to at least one other joint in the skeletal model by way of a member.

The joints of the skeletal model are each associated with a respective plurality of points in the lidar point cloud. By way of example, and not limitation, each of the points in the lidar point cloud that is representative of the pedestrian can be assigned to the joint in the skeletal model that the point is closest to. In another example, the points that are representative of the pedestrian can be assigned to joints in the skeletal model based upon any of various clustering algorithms. In addition to being assigned a position, each of the joints can further be assigned a lidar intensity value that is based upon the lidar intensity values of the points associated with the joint. In an example, the lidar intensity value of a joint can be a weighted average of intensity values of the points that are associated with the joint.

Figure 4:
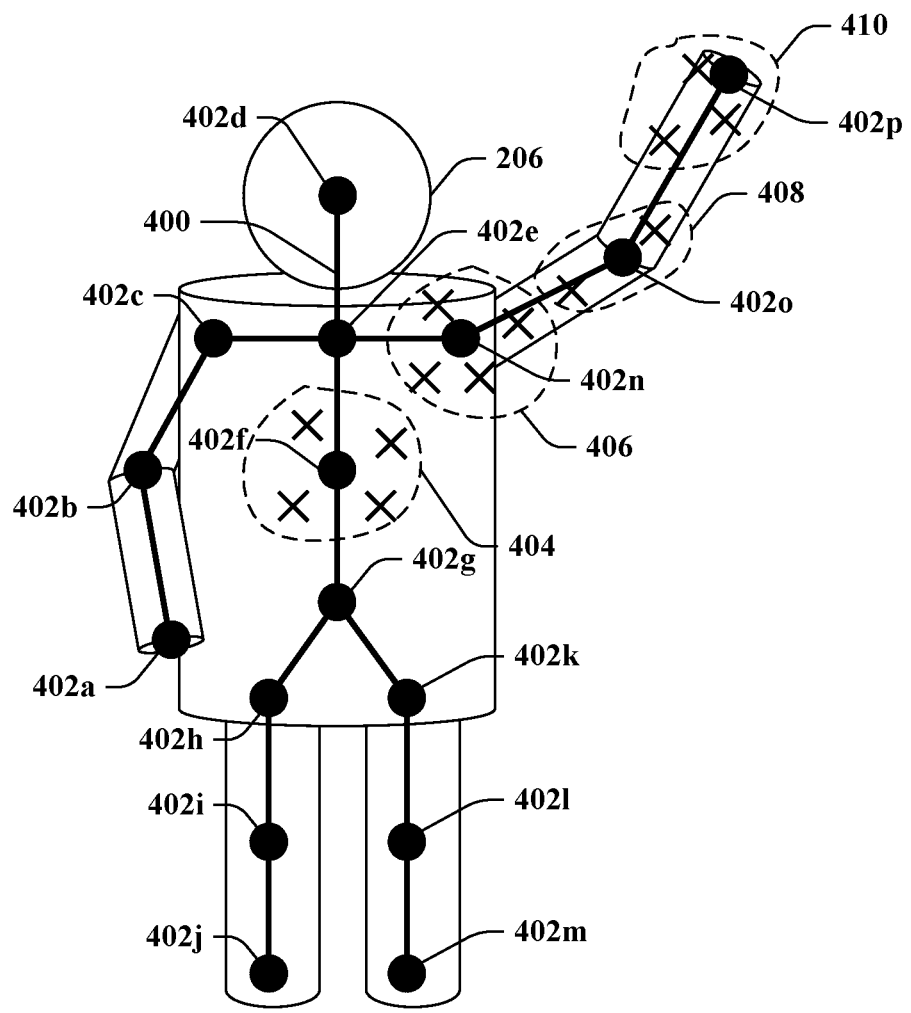
FIG. 4 is a conceptual diagram of an exemplary skeletal model overlaid on a pedestrian making a hailing gesture.

By way of example, and referring now to FIG. 4, an exemplary skeletal model 400 that is representative of the pedestrian 206 in the driving environment 200 is illustrated. The skeletal model 400 includes a plurality of joints 402a-402p. The joints 402a-402p each have assigned a respective three-dimensional position. The three-dimensional positions of the joints 402a-402p are determined by the skeleton detection algorithm based upon the positions of the lidar points that are representative of the pedestrian 206. Each of the joints 402a-402p is further associated with a respective plurality of points in a lidar point cloud. For example, a first plurality of lidar points 404 is assigned to the joint 402f, a second plurality of lidar points 406 is assigned to the joint 402n, a third plurality of lidar points 408 is assigned to the joint 402o, a fourth plurality of lidar points 410 is assigned to the joint 402p, etc. Accordingly, the intensity value of the joint 402f is based upon the intensity values of the points 404, the intensity value of the joint 402n is based upon the intensity values of the points 406, etc.

In exemplary embodiments, the skeletal model generated by the skeletal modeling component 308 can include greater than or equal to 15 joints. A greater number of joints in the skeletal model can improve the accuracy of the pose similarity component 310 in determining whether the pedestrian is making a hailing signal. In further embodiments, the skeletal model generated by the skeletal modeling component 308 can include greater than or equal to 15 joints and less than or equal to 20 joints. Constraining the number of joints of the skeletal model to be less than or equal to 20 joints can ensure that subsequent computations based on the skeletal model and that are required to determine whether the pedestrian is making the hailing signal can be performed fast enough to be useful to the AV 100. For instance, whether a pedestrian is making a hailing signal is desirably determined by the AV 100 prior to the AV 100 driving past the pedestrian. It is to be understood that the skeletal modeling component 308 can generate the skeletal model to have a greater number of joints than 20, in particular as computing systems are developed that can more rapidly perform the various computations associated with acts described herein.

The skeletal modeling component 308 outputs the skeletal model to the pose similarity component 310. The pose similarity component 310 generates a pose similarity score based upon the skeletal model. As noted above, the pose similarity score indicates a likelihood that the pedestrian represented by the skeletal model is making a hailing gesture.

In one exemplary embodiment, the pose similarity component 310 generates the pose similarity score based upon a comparison between a reference skeletal model and the skeletal model generated by the skeletal modeling component 308. The reference skeletal model includes a plurality of joints. In various embodiments, the reference skeletal model includes a same number of joints as the skeletal model generated by the skeletal modeling component 308. The pose similarity component 310 performs an affine transformation of the skeletal model onto the reference skeletal model. In an example, the pose similarity component 310 performs the affine transformation such that at least one of the joints of the skeletal model of the pedestrian overlaps with a corresponding joint in the reference skeletal model. After performing the affine transformation of the skeletal model onto the reference skeletal model, the pose similarity component 310 computes the distance from each point in the skeletal model of the pedestrian to its corresponding point in the reference skeletal model.

Figure 5:
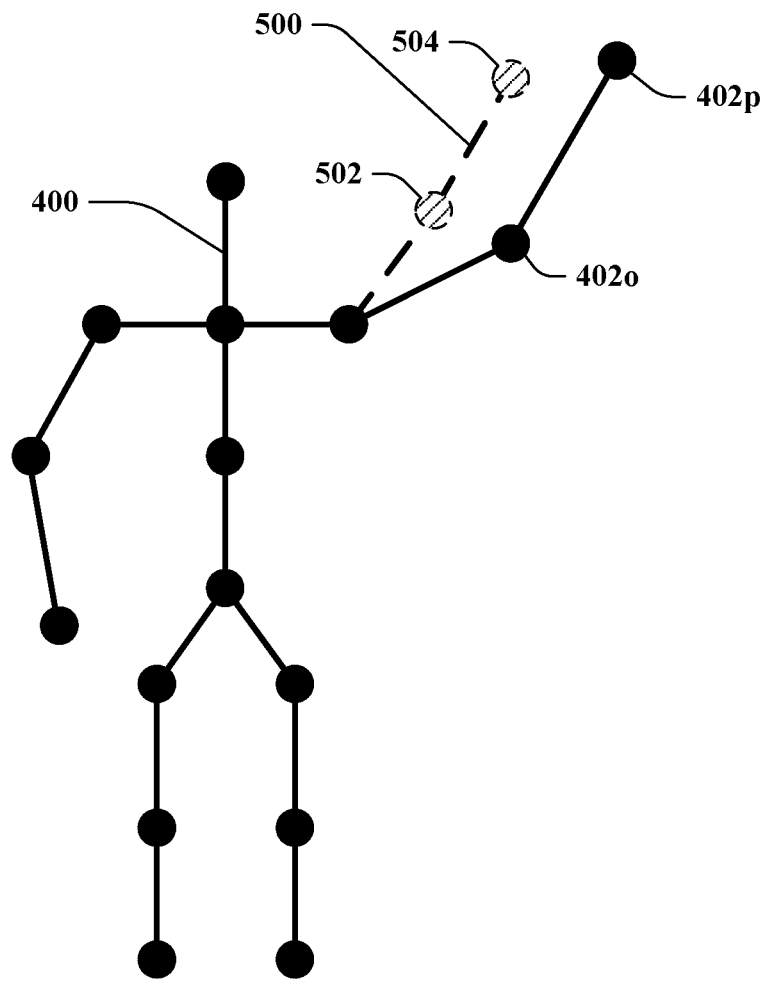
FIG. 5 is a conceptual diagram of a reference skeletal model overlaid on the skeletal model depicted in FIG. 4.

By way of example, and referring now briefly to FIG. 5, the skeletal model 400 is shown overlaid on a reference skeletal model 500. For simplicity, the skeletal model 400 is shown as deviating from the reference skeletal model 500 at only two joints, 402o and 402p. The reference skeletal model 500 includes joints 502, 504 that correspond to the joints 402o and 402p, respectively. In connection with generating the pose similarity score, the pose similarity component 310 computes the distance from the joint 502 to the joint 402o, and computes the distance from the joint 504 to the joint 402p. Since the remaining joints of the skeletal model 400 overlap with the joints of the reference skeletal model 500, the distances associated with those joints is zero.

Referring now again to FIG. 4, the pose similarity component 310 generates a pose similarity score for the skeletal model of the pedestrian based upon the computed distances between the joints of the skeletal model and their corresponding joints in the reference skeletal model. In a non-limiting example, the pose similarity component 310 computes the $L_2$-norm of the computed distances, which can then be used as the pose similarity score. It is to be understood that other error computations can be used by the pose similarity component 310 to generate the pose similarity score. In another example, the pose similarity score can be generated based upon a weighted combination of the computed distances. For instance, the pose similarity score can be a weighted combination of the computed distances wherein distances for joints that are most significant for a hailing signal are weighted more heavily than other joints. By way of further illustration, the distances between the joints 402o, 402p and their corresponding joints 502, 504 in the reference skeletal model 500 can be weighted more heavily than distances for other joints in the models 400, 500 since arms are more significant for the raised arm hailing gesture than other portions of a skeleton. The pose similarity component 310 can determine whether the pedestrian is making a hailing gesture based upon the pose similarity score. In an exemplary embodiment, the pose similarity component 310 determines that the pedestrian is making the hailing gesture based upon the pose similarity score exceeding a similarity threshold.

In another exemplary embodiment, and referring again to FIG. 4, the pose similarity component 310 includes a neural network component 312, and the pose similarity component 310 generates the pose similarity score based upon output of the neural network component 312. The neural network component 312 can be or include a deep neural network (DNN) such as a convolutional neural network. The DNN is trained to receive input features derived from the skeletal model generated by the skeletal modeling component 308 and to output a pose similarity score, the pose similarity score being a probability that the pedestrian represented by the skeletal model is making a hailing signal. In an exemplary embodiment, the input to the DNN is an ordered sequence of coordinate triples that are the coordinates of the joints of the skeletal model of the pedestrian. In various embodiments, the input to the DNN further includes the lidar intensity values of the joints of the skeletal model. The neural network component 312 is configured to receive the skeletal model from the skeletal modeling component 308 and to parametrize the skeletal model to derive the input features. The neural network component 312 provides the derived input features to the DNN. The DNN receives the input features at an input layer and propagates the features through a plurality of hidden layers. In exemplary embodiments wherein the DNN is a convolutional neural network, the hidden layers include one or more convolutional layers. The input is propagated through the hidden layers to an output layer, whereupon the DNN outputs a probability that the pedestrian is making a hailing signal. The pose similarity component 310 treats the probability as a pose similarity score. Accordingly, the pose similarity component 310 can output an indication that the pedestrian is making the hailing signal based upon the probability output by the DNN. By way of example, the pose similarity component 310 can output the indication that the pedestrian is making the hailing signal responsive to determining that the probability output by the DNN is greater than a threshold probability.

It is to be understood that the pose similarity component 310 can be configured to generate the pose similarity score based upon hailing signals that are in common use in the driving environment of the AV 100. For example, a common hailing signal for taxis in cities in the United States is a hand raised toward the street. The pose similarity component 310 can therefore evaluate the skeletal model generated by the skeletal modeling component 308 against a reference skeletal model representing the pose of a raised hand. In other embodiments, the neural network component 312 can be trained based upon training data labeled such that a raised hand is indicating as being a hailing signal. However, the pose similarity score can also be configured to generate the pose similarity score based upon any other hailing signal that may be in common use in the driving environment of the AV 100 so that the AV 100 is adaptable to different environments where common hailing signals may be different.

Referring now once again to FIG. 1, responsive to determining that the that a pedestrian in the driving environment of the AV 100 is making a hailing signal (e.g., based on a pose similarity score as described above), the gesture recognition component 120 outputs an indication that the pedestrian is making the hailing signal to the control system 122. The control system 122 can control operation of the mechanical systems of the AV 100 responsive to receiving the indication. In exemplary embodiments, responsive to receiving the indication that a pedestrian is making a hailing signal, the control system 122 can control the AV to initiate a pickup maneuver. The pickup maneuver can include decelerating the AV 100, changing lanes to approach the pedestrian, etc.

In other exemplary embodiments, the AV 100 can be configured to make multiple determinations that a pedestrian is making a hailing signal prior to initiating a pickup maneuver to approach the pedestrian. For instance, it may be undesirable for the AV 100 to approach a pedestrian whose arm is raised only for an instant since the pedestrian could be raising her arm for other reasons, for example to wave to an acquaintance across the street. Accordingly, the AV 100 can be configured such that the gesture recognition component 120 makes multiple positive determinations that a pedestrian is making a hailing signal prior to the control system 122 executing a pickup maneuver to approach the pedestrian. By way of example, the gesture recognition component 120 repeats the generating the skeletal model, generating the pose similarity score, and determining whether the pedestrian is making a hailing signal a plurality of times. The control system 122 can execute the pickup maneuver based upon the gesture recognition component 120 determining multiple times that the pedestrian is making the hailing signal. In a non-limiting example, the control system 122 can execute the pickup maneuver responsive to the gesture recognition component 120 making a positive determination that the pedestrian is making the hailing signal a threshold number of times in a row. In another example, the gesture recognition component 120 can be configured to make the determination whether the pedestrian is making the hailing signal a plurality of times within a defined period of time. The control system 122 can be configured to initiate the pickup maneuver responsive to determining that a threshold number of positive determinations have been made by the gesture recognition component 120 within the period of time. In such embodiments, the AV 100 may be more robust to false negatives.

The AV 100 can further be configured to confirm a determination that a pedestrian is making a hailing signal using data from the other sensor systems 102-104 mounted on the AV 100 prior to making a pickup maneuver. Whereas the gesture recognition component 120 can determine whether the pedestrian is making a hailing gesture based upon lidar data obtained when the AV 100 is 40 meters away from the pedestrian or more, other sensor systems 102-104 of the AV 100 may not provide sufficient detail for the gesture recognition component 120 to make such a determination at those ranges. The control system 122 can be configured to move the AV 100 closer to the pedestrian responsive to the gesture recognition component 120 determining that a pedestrian is making a hailing gesture based upon lidar data output by the lidar sensor system 101. After the AV 100 moves closer to the pedestrian, one of the other sensor systems 102-104 can capture data relating to the pedestrian, and the gesture recognition component 120 can determine whether the pedestrian is making a hailing gesture based upon such data. By way of example, and not limitation, the sensor system 102 can be an imaging system that includes a camera. The camera can capture an image of a pedestrian that has been determined by the gesture recognition component 120 to be making a hailing signal (e.g., based upon lidar data). The gesture recognition component 120 can then execute any of various image analysis algorithms over the image to confirm whether the pedestrian is making a hailing signal in the image. Responsive to the gesture recognition component 120 confirming that the pedestrian is making the hailing signal, the control system 122 can initiate a pickup maneuver to approach the pedestrian and allow the pedestrian to board the AV 100.

In order to conserve computing resources, operation of the gesture recognition component 120 can be ceased during a time when the AV 100 is conveying a passenger to a destination. Thus, the AV 100 can be configured to only look for pedestrians in the driving environment who are making hailing gestures when the AV 100 is empty and available for transport.

Figure 6:
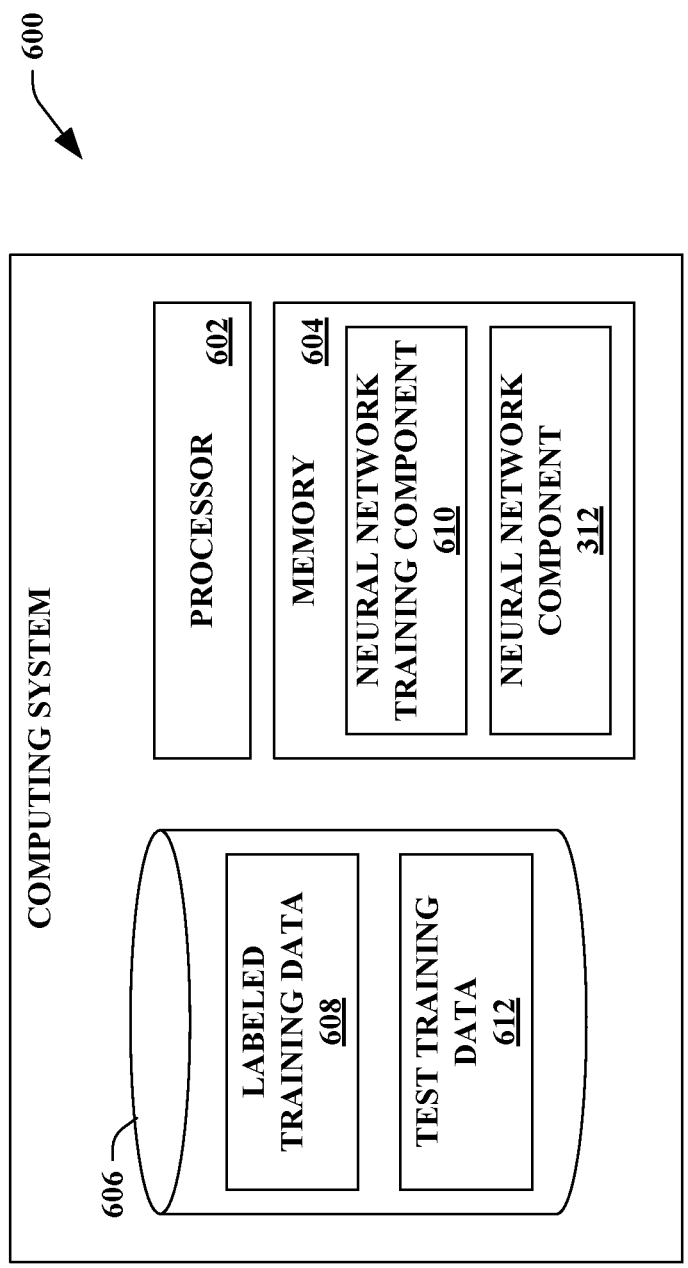
FIG. 6 is a functional block diagram of an exemplary system that is configured to train a neural network component included in the gesture recognition component in FIG. 3.

With reference now to FIG. 6, an exemplary computing system 600 that is configured to train the neural network component 606 is illustrated. The computing system 600 includes a processor 602 and memory 604, wherein the memory 604 includes instructions that are executed by the processor 602. The computing system 600 additionally includes a data store 606 that comprises labeled training data 608. The memory 604 includes a neural network training component 610 that trains the neural network component 312. The neural network training component 610 receives the labeled training data 608, wherein the labeled training data 608 comprises skeletal model data (e.g., parameterized as described above with respect to input features of the DNN), wherein the skeletal model data includes data indicating which skeletal models are representative of pedestrians making hailing signals. The neural network training component 610 trains the neural network component 312 such that the probability that a pedestrian is making a hailing gesture that is output by the neural network component 312 is higher for skeletal models representing pedestrians making hailing gestures and lower for skeletal models representing pedestrians that are not making hailing gestures. The neural network component 312 can be validated based upon a test training data set 612, which is also labeled, to ensure that the neural network component 312 produces outputs with acceptable characteristics (e.g., such the neural network component 312 indicates a high probability that a pedestrian is making a hailing gesture when the neural network is provided with a skeletal model of a pedestrian making a hailing gesture).

Figure 7:
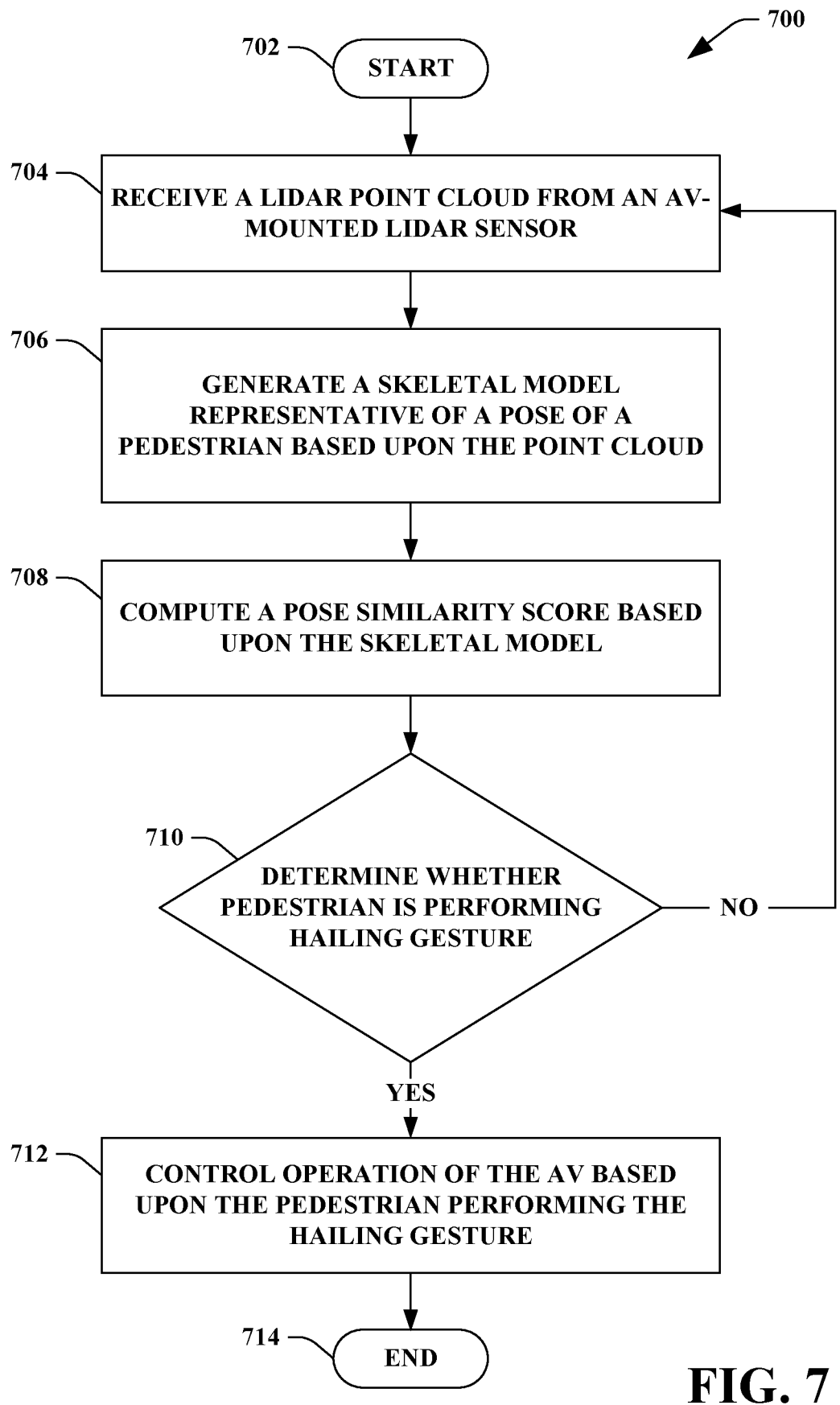
FIG. 7 is a flow diagram illustrating an exemplary methodology for controlling operation of a mechanical system of an AV based upon determining whether a pedestrian is performing a hailing gesture.
Figure 8:
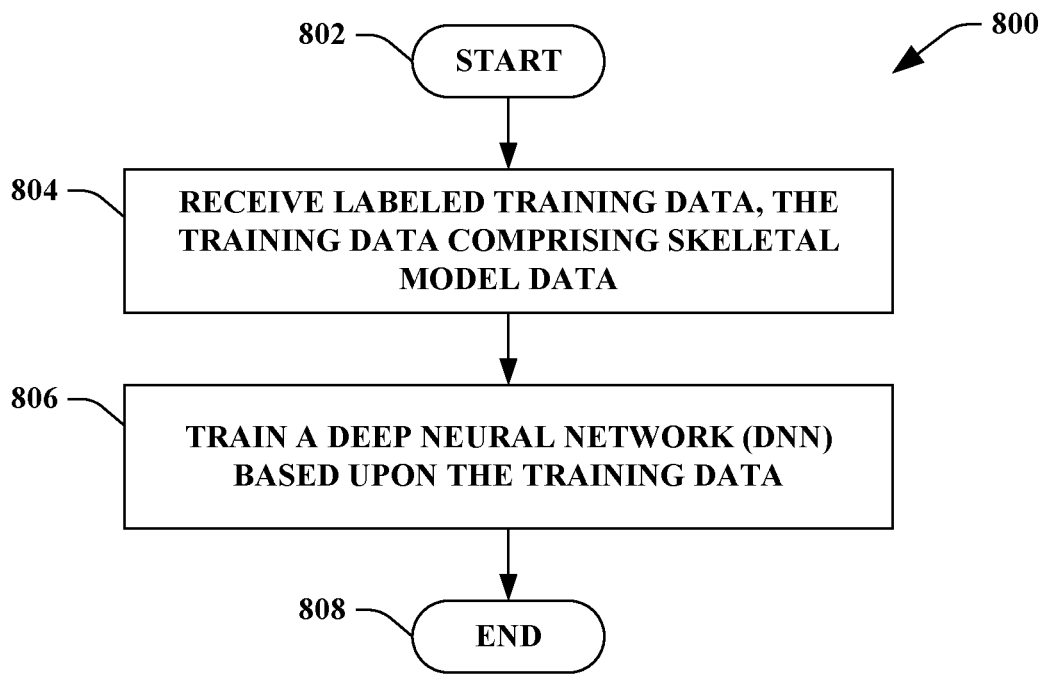
FIG. 8 is a flow diagram illustrating an exemplary methodology for training a neural network to be included in a gesture recognition component of an AV.

FIGS. 7 and 8 illustrate exemplary methodologies relating to controlling an AV based upon determining whether a pedestrian in the driving environment is making a hailing signal. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for controlling operation of an AV based upon a pedestrian performing a hailing gesture is illustrated. The methodology 700 starts at 702, and at 704 a lidar point cloud is received, wherein the lidar point cloud comprises a plurality of points representative of positions of objects in a driving environment of an AV. In exemplary embodiments, each of the points in the point cloud includes a coordinate triple corresponding to a location of an object in the driving environment. Each of the points can further include an intensity value indicative of an intensity of a lidar return received from the point. At 706, a skeletal model that is representative of a pose of the pedestrian is generated based upon the lidar point cloud. In exemplary embodiments, the skeletal model can be generated by executing a skeleton detection algorithm over the points in the point cloud that are representative of the pedestrian. In various embodiments, the skeletal model includes a plurality of joints, wherein each of the joints is assigned a three-dimensional position. The joints can further be assigned an intensity value that is a weighted combination of points in the point cloud that are assigned to the joints. At 708 a pose similarity score is computed based upon the skeletal model. The pose similarity score is configured to be indicative of a likelihood that the pedestrian is performing the hailing gesture. At 710 a determination is made, based upon the pose similarity score, whether the pedestrian is performing a hailing gesture. If it is determined at 710 that the pedestrian is not performing the hailing gesture, the methodology 700 returns to 704 and another lidar point cloud is received. If it is determined at 710 that the pedestrian is performing the hailing gesture, the methodology proceeds to 712, whereupon operation of the AV is controlled based upon the determination that the pedestrian is performing the hailing gesture. By way of example, the AV can be controlled to initiate a pickup maneuver that causes the AV to approach the pedestrian, in order to facilitate the pedestrian boarding the AV. The methodology 700 completes at 714.

Turning now to FIG. 8, an exemplary methodology 800 that facilitates training a DNN is illustrated, wherein the DNN is configured for use in a gesture recognition component of an AV to determine whether a pedestrian in a driving environment is making a hailing signal. The methodology 800 starts at 802, and at 804 labeled training data is received, wherein the training data comprises labeled skeletal model data. At 806, a DNN is trained based upon the training data. The DNN is configured such that responsive to receiving a vector of input features that are representative of a skeletal model of a pedestrian in a driving environment, the DNN outputs a probability that the pedestrian is making a hailing signal. The DNN is trained at 806 such that the DNN outputs a higher probability corresponding to the pedestrian making a hailing signal when the DNN is provided a skeletal model for a pedestrian that is actually making a hailing signal. Likewise, the DNN is trained at 806 such that the DNN outputs a lower probability corresponding to the pedestrian making a hailing signal when the DNN is provided a skeletal model for a pedestrian that is not making a hailing signal. The methodology 800 completes at 808.

Figure 9:
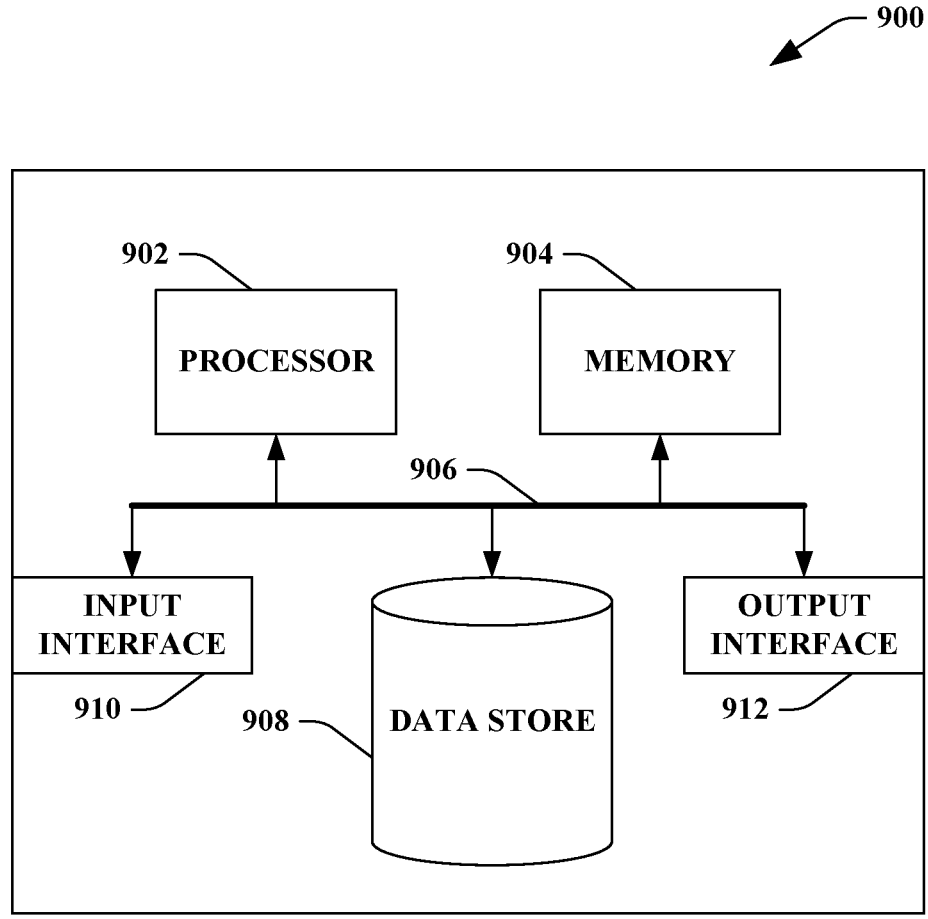
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 112 or the computing system 600. The computing device 900 includes at least one processor 902 that executes instructions that are stored in a memory 904. The instructions may be, for instance, instructions for implementing functionality described as being carried out by one or more modules, components, or systems discussed above or instructions for implementing one or more of the methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store point cloud data, skeletal model data, training data, etc.

The computing device 900 additionally includes a data store 908 that is accessible by the processor 902 by way of the system bus 906. The data store 908 may include executable instructions, sensor data, skeletal model data, training data, etc. The computing device 900 also includes an input interface 910 that allows external devices to communicate with the computing device 900. For instance, the input interface 910 may be used to receive instructions from an external computing device, etc. The computing device 900 also includes an output interface 912 that interfaces the computing device 900 with one or more external devices. For example, the computing device 900 may transmit control signals to the vehicle propulsion system 106, the braking system 108, and/or the steering system 110 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle (AV) comprising:
a lidar sensor; and
a computing system that is in communication with the lidar sensor, wherein the computing system comprises:
a processor; and
memory that stores instructions that, when executed by the processor, cause the processor to perform acts comprising:

receiving lidar data from the lidar sensor, the lidar data being data generated by the lidar sensor responsive to performing a lidar scan of a driving environment of the AV, the lidar data being indicative of a point cloud that includes a first plurality of points, each of the first plurality of points of the point cloud comprising data indicative of a coordinate triple corresponding to a location of an object in the driving environment;

determining that a second plurality of points is representative of a pedestrian in the driving environment, the second plurality of points being a subset of the first plurality of points;

identifying, based upon the second plurality of points, a skeletal model for the pedestrian in the driving environment;

generating a pose similarity score based upon the skeletal model;

determining that the pedestrian is making a hailing signal based upon the pose similarity score; and controlling operation of the AV in the driving environment based upon determining that the pedestrian is making the hailing signal.

2. The AV of claim 1, wherein the skeletal model comprises a plurality of joints, each of the joints being assigned data indicative of a position, wherein each of the second points is assigned to a respective joint in the joints.

3. The AV of claim 2, wherein the position assigned to a first joint in the joints is based upon coordinate triples of the second points that are assigned to the first joint.

4. The AV of claim 2, wherein the plurality of joints includes at least 15 joints.

5. The AV of claim 4, wherein the plurality of joints includes less than or equal to 20 joints.

6. The AV of claim 2, wherein generating the pose similarity score comprises performing a comparison between the skeletal model and a reference skeletal model, the reference skeletal model comprising a second plurality of joints, each of the second plurality of joints corresponding to a different joint in the skeletal model.

7. The AV of claim 6, wherein performing the comparison between the skeletal model and the reference skeletal model comprises:

performing an affine transformation of the skeletal model to the reference skeletal model; and computing a distance between each of the joints of the skeletal model and its corresponding joint in the second plurality of joints, wherein the pose similarity score is based upon the computed distances.

8. The AV of claim 7, wherein generating the pose similarity score comprises computing the $L_2$-norm of the computed distances.

9. The AV of claim 1, wherein generating the pose similarity score comprises providing the skeletal model to a neural network, wherein responsive to receipt of the skeletal model the neural network computes a probability that the pedestrian is making the hailing signal, the probability being the pose similarity score.

10. The AV of claim 9, wherein the skeletal model comprises a plurality of joints, each of the joints being assigned data indicative of a position, wherein each of the second points is assigned to a respective joint in the joints.

11. The AV of claim 10, wherein each of the second points further comprises data indicative of an intensity of a lidar return, and wherein each of the joints is further assigned data indicative of an intensity value, the intensity value of a first joint in the joints being based upon intensities of the second points that are assigned to the first joint.

12. The AV of claim 1, wherein controlling the operation of the AV comprises causing the AV to initiate a pickup maneuver responsive to determining that the pedestrian is making the hailing signal.

13. The AV of claim 1, further comprising an imaging system, wherein the imaging system generates an image of the pedestrian, and wherein the acts further comprise:

confirming that the pedestrian is making a hailing signal based upon the image of the pedestrian; and responsive to confirming that the pedestrian is making the hailing signal, controlling the operation of the AV in the driving environment to initiate a pickup maneuver.

14. A method for controlling an autonomous vehicle (AV), the method comprising:

receiving a lidar point cloud from a lidar sensor mounted on the AV, the point cloud generated by the lidar sensor responsive to performing a lidar scan of a driving environment of the AV, the point cloud comprising a first plurality of points, each of the points of the point cloud being assigned data indicative of a coordinate triple corresponding to a location of an object in the driving environment;

identifying a second plurality of points in the point cloud that are representative of a pedestrian;

generating a skeletal model that is representative of a pose of the pedestrian based upon the second plurality of points;

computing a pose similarity score based upon the skeletal model;

determining that the pedestrian is performing a hailing gesture based upon the pose similarity score; and controlling operation of the AV in the driving environment based upon determining that the pedestrian is making the hailing signal.

15. The method of claim 14, further comprising:

repeating the acts of receiving the lidar point cloud, generating the skeletal model, computing the pose similarity score, and determining that the pedestrian is performing the hailing gesture a plurality of times; and responsive to determining, a plurality of times, that the pedestrian is performing the hailing gesture, initiating a pickup maneuver to cause the AV to approach the pedestrian.

16. The method of claim 14, further comprising:

confirming that the pedestrian is performing the hailing gesture based upon sensor data from another sensor mounted on the AV; and responsive to confirming that the pedestrian is performing the hailing gesture, initiating a pickup maneuver to cause the AV to approach the pedestrian.

17. A computing system comprising:

a processor; and memory that stores instructions that, when executed by the processor, cause the processor to perform acts comprising:

computing a skeletal model for a pedestrian in a driving environment of an autonomous vehicle (AV) based upon a lidar point cloud generated by a lidar sensor included on the AV, the pedestrian represented in the lidar point cloud;

providing the skeletal model as input to a convolutional neural network;

outputting, by way of the convolutional neural network, a probability that the pedestrian is making the hailing signal;

determining that the pedestrian is making the hailing signal based upon the probability output by the convolutional neural network; and causing the AV to initiate a pickup maneuver to approach the pedestrian responsive to determining that the pedestrian is making the hailing signal.

18. The method of claim 14, wherein computing the pose similarity score comprises:

providing the skeletal model as input to a neural network; and outputting, by way of the neural network, a probability that the pedestrian is making the hailing signal, the probability being the pose similarity score.

19. The method of claim 14, wherein computing the pose similarity score comprises computing a measure of similarity between the skeletal model and a reference skeletal model, the measure of similarity being the pose similarity score, and wherein the reference skeletal model is representative of the hailing gesture.

20. The computing system of claim 17, the acts further comprising:

determining that a subset of points of the lidar point cloud is representative of the pedestrian, and wherein computing the skeletal model for the pedestrian is based upon the subset of points having been determined to be representative of the pedestrian.

* * * * *